United States Patent [19]

Lane et al.

[11] Patent Number: 5,018,220
[45] Date of Patent: May 28, 1991

[54] FIREFIGHTER'S HELMET

[75] Inventors: Abbott A. Lane, Dayton; John M. Hetzel, Jr., Kettering, both of Ohio

[73] Assignee: Firequip Helmets, Inc., Dayton, Ohio

[21] Appl. No.: 483,645

[22] Filed: Feb. 23, 1990

[51] Int. Cl.⁵ .............................................. A42B 3/00
[52] U.S. Cl. ................................................... 2/5; 2/8; 428/920
[58] Field of Search .............................. 2/5, 7, 8, 410; 428/911, 284, 920

[56] References Cited

U.S. PATENT DOCUMENTS

| 4,134,155 | 1/1979 | Robertson | 2/412 |
| 4,143,197 | 3/1979 | Jasionowicz et al. | 428/225 |
| 4,288,268 | 9/1981 | Hartung | 156/245 |
| 4,502,153 | 3/1985 | Lapedts et al. | 2/81 |
| 4,573,217 | 3/1986 | Reed | 2/7 |
| 4,619,003 | 10/1986 | Asbury | 2/5 |
| 4,656,667 | 4/1987 | Blake | 2/5 |
| 4,748,996 | 6/1988 | Combier | 139/415 |
| 4,766,609 | 8/1988 | Lane | 2/5 |
| 4,809,690 | 3/1989 | Bouyssi et al. | 128/157 |
| 4,883,700 | 11/1989 | Harpell et al. | 428/113 |

FOREIGN PATENT DOCUMENTS 108865 7/1983 European Pat. Off. ................. 2/7

Primary Examiner—Werner H. Schroeder
Assistant Examiner—Michael A. Neas
Attorney, Agent, or Firm—Jacox & Meckstroth

[57] ABSTRACT

A firefighter's helmet having improved heat resistance and protective qualities while being also relatively light in weight having a protective outer shell composed of at least one layer of a fabric of a mixture of polybenzimidazole and high modulus aramid materials and a complementary layer of a very fine glass cloth adjacent at least one side of the polybenzimidazole-aramid layer, impregnated with and molded in a desired shape within a polyester resin material containing a small percentage of a coupling agent. The outer shell may also consist of additional layers of fibrous reinforcing materials molded within the resin material.

13 Claims, 1 Drawing Sheet

FIREFIGHTER'S HELMET

BACKGROUND OF THE INVENTION

One of the major problems encountered by a firefighter is stress. One of the major causes of stress in a firefighter pertains to the weight of the garments worn by the firefighter. One of the garments worn by a firefighter is a helmet.

Conventionally, a firefighter's helmet comprises a rigid outer layer or shell which covers a resilient, deformable intermediate layer surrounding an inner molded plastic impact cap. The principal purpose of the shell is to provide strength and resistance to impact and resistance to penetrating forces and objects, while that of the intermediate layer is to absorb shock.

To achieve the desired strength and impact resistance qualities, the shell of the firefighter's helmet is conventionally made of a composite, fiber-reinforced plastics material, such as a glass fiber reinforced polyester resin. Fiber materials are positioned within molded polyester resin materials. The fiber materials may be in the form of glass type single fibers mixed into the resin or a mat of glass fibers impregnated with resin and/or woven glass cloth impregnated with resin. The shell may have only one type of reinforcement materials or a combinaton of two or more types of reinforcement materials.

The strength and impact resistant qualities of the shell are directly related to the reinforcement materials within the resin of the shell. The resin, which is the heaviest material in the shell, provides no strength or impact or penetration qualities to the shell. Such qualities relate only to fiber material within the resin material.

It is equally important, however, that the shell be able to withstand and retard the transmission of heat, not only for the maintenance of its own integrity in highly heated environments but also for the protection of the intermediate layer which is conventionally composed of a urethane foam material. If the shell does not resist the heat properly, the heat will penetrate the shell and cause partial disintegration of the urethane foam of the intermediate layer. When this occurs the helmet loses its shock absorbing capability.

The mass created by the polyester resin has a definite effect in this critical area. That is, the less mass in the polyester resin, the greater the heat penetration through the helmet and thus the less effective heat protection in the helmet.

A problem exists in regard to reducing the weight of a firefighter's helmet by reducing the mass of the polyester resin, without reducing the heat resistant qualities of the outer shell.

It is therefore an object of this invention to provide a firefighter's helmet which has minimum weight while also providing good thermal protection.

It is another object of this invention to provide such a firefighter's helmet which has excellent impact resistant and shock absorbing qualities under both high heat and low heat conditions.

Other objects and advantages of this invention reside in the construction of parts, the combination thereof, the method of production and the mode of use, as will become more apparent from the following description.

SUMMARY OF THE INVENTION

This invention comprises a firefighter's helmet which includes, in addition to the conventional innermost impact cap and overlying intermediate cushioning layer, an outer shell which has excellent heat insulation and shock and impact resistant qualities.

In addition, or in lieu of, the glass fiber reinforced layers characteristically employed in prior art helmets, the outer shell according to this invention comprises at least one heat-resistant reinforcing layer composed of a fabric of a mixture of polybenzimidazole and high modulus aramid and a layer of very fine glass cloth on one or both sides of the polybenzimidadzolearamid layer. All of these layers are impregnated with polyester resin. Preferably, the polyester resin includes a coupling agent.

DETAILED DESCRIPTION OF THE PREFERRED EMBODIMENT OF THE INVENTION

Figure 1:
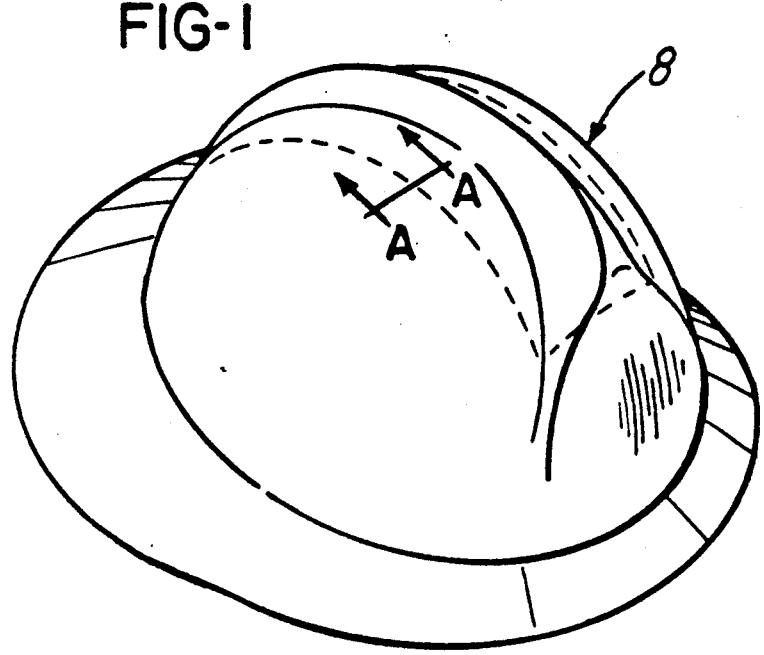
FIG. 1 is a perspective view of the shell of a firefighter's helmet.

FIG. 1 illustrates generally a shell 8 of a firefighter's helmet.

Figure 2:
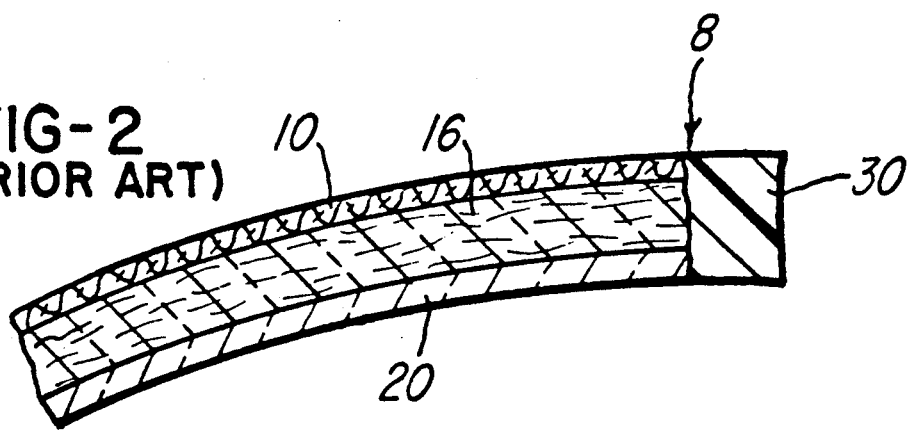
FIG. 2 is a greatly enlarged sectional view taken substantially on line A—A of FIG. 1, showing prior art construction of a firefighter's helmet.

FIG. 2 illustrates details of the construction of the shell of a firefighter's helmet in accordance with the prior art.

In accordance with the prior art, as shown in FIG. 2, the shell 8 of a firefighter's helmet typically comprises superimposed reinforcing layers of fibrous materials, such as an outer layer 10, which may be in the form of a woven fabric of fine glass strands, an intermediate layer 16 which may be in the form of a felted or preformed mat of compacted discrete fibers, such as coarse glass fibers, and an inner layer 20 which may again be in the form of a woven fabric of glass strands or glass fibers formed into strands. All of the layers 10, 16, and 20 are impregnated with polyester resin material 30, as the layers 10, 16, and 20 and the polyester resin are molded together to form the shell 8 in accordance with the prior art.

A shell of this invention may have the same general appearance as the shell 8 shown in FIG. 1 and include an outer reinforcing layer 40 and an intermediate reinforcing layer 46. In the case of the preferred embodiment of this invention illustrated in FIG. 3, the outer layer 40 is composed of a fabric woven from fine glass strands. One such fabric, known as "SURMAT 4L", is sold by Nicofibers, Inc., Shawnee, Ohio, and comprises four basic layers, each having a thickness of about 0.0015 inches woven from strands within the range of from 24 to 26 microns in diameter.

Figure 3:
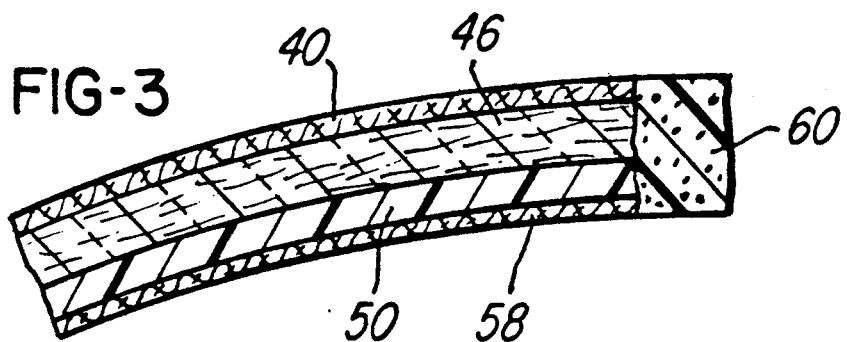
FIG. 3 is a greatly enlarged sectional view taken substantially on line A—A of FIG. 1 showing the construction of a firefighter's helmet in accordance with this invention.

The layer 46 is preferably, but not necessarily, preformed in the desired configuration prior to positioning under the layer 40. This coarse high strength material may be, for example, a material sold by Canfield Mfg. Co., Zeeland, Michigan, and is a roving type of material comprising individual fibers about 0.015 inches in diameter. Improved heat resistance and heat retardation, without substantialy increasing the weight of the helmet, is achieved in accordance with the stated objects of this invention. The preferred embodiment of this invention, as illustrated in FIG. 3, includes at least one heat-resistant reinforcing layer 50 which includes a mixture of polybenzimidazole and aramid materials, preferably in the form of a fabric formed from fibers or strands of such materials. One specific example of such fabric is a knit cloth, which is sold by Hoechst Celanese Corporation, Charlotte, North Carolina, and is identified by that company as raschel knit material, of the Queens Cord type. This knit cloth material includes about thirty-four percent (34%) polybenzimidazole material and about sixty-six percent (66%) high modulus aramid material. The aramid material is a fiber material which has high strength to resist breaking under tensional forces. The knit cloth material, preferably, has a weight of about five ounces per square yard. The high modulus aramid material may also be that which is identified by Dupont Corporation as "KEVLAR" material.

To lock the polybenzimidazole-aramid material into the shell and to ensure that it will not delaminate upon exposure to high heat, the present invention teaches the positioning of a complementary layer 58 of a very fine glass cloth called veil on one or both sides of the polybenzimidazole-aramid layer 50.

All of the layers 40, 46, 50 and 58 are impregnated and molded together with polyester resin 60 which, preferably, includes, by volume, about one-half of one percent, a coupling agent such as ZIRCONIUM IV DI NEOALKANOLATO, DI (PARA AMINO BENZOATO-O) sold by Kenrich Petrochemicals, Inc. and referred to by that company as NZ-37, its trademark.

The coupling agent within the polyester resin 60 permits the polyester resin 60 to be very adherent to the layers 40, 46, 50, and 58, particularly the layer 50 and has been found to contribute further, in its combination with the complementary layer 58, to preventing delamination of the polybenzimidazole-aramid layer 50.

The layers 40, 46, 50, and 58 of a shell, such as the shell 8 shown in FIG. 1, when constructed in accordance with the structure of FIG. 3 are firmly held together under high heat conditions, as well as under low heat conditions. The shell 8 constructed as shown in FIG. 3 has excellent heat insulation qualities and excellent impact resistant qualities.

A shell 8 constructed in accordance with this invention permits a firefighter's helmet to be lighter in weight than a conventional firefighter's helmet, while also having greater thermal barrier characteristics than a conventional firefighter's helmet.

Although the preferred embodiment of a shell of a firefighter's helmet of this invention has been described, it will be understood that within the purview of this invention various changes may be made in the form, details, proportion and arrangement of parts, the combination thereof, and the mode of use, which generally stated consist in a shell of a firefighter's helmet within the scope of the appended claims.

The invention having thus been described, the following is claimed.

1. A method of producing a shell of a firefighter's helmet comprising providing a layer of fine fiber glass type material, covering the layer of fine fiber glass material with a layer of knit cloth material, covering the layer of knit cloth material with a layer of coarse fiber glass type material, covering the layer of coarse fiber glass type material with a layer of fine fiber glass type material, impregnating the layers in a body of polyester resin material, and molding all of the materials into a desired shape of a shell of a firefighter's helmet.

2. The method of claim 1 wherein the layer of cloth knit material is a raschel knit type of material.

3. The method of claim 1 wherein the polyester resin material includes a coupling agent which is about one-half of one percent by volume of the polyester resin material.

4. A firefighter's helmet comprising a rigid outer shell including at least one layer of a fabric of a mixture of polybenzimidazole and aramid materials impregnated with and molded in a desired shape within a resin material wherein a complementary layer of a very fine glass cloth is adjacent at least one side of the polybenzimidazole-aramid fabric layer, the very fine glass cloth comprising individual fibers having a transverse dimension of from 24 to 26 microns.

5. A firefighter's helmet comprising a rigid outer shell including at least one layer of a fabric of a mixture of polybenzimidazole and aramid materials impregnated with and molded in a desired shape within a resin material wherein the resin material includes a coupling agent.

6. A firefighter's helmet comprising a rigid outer shell including at least one layer of a fabric of a mixture of polybenzimidazole and aramid materials impregnated with and molded in a desired shape within a resin material wherein the resin material includes a coupling agent and said coupling agent is ZIRCONIUM IV DI NEOALKANOLATO, DI (PARA AMINO BENZOATO-O).

7. A firefighter's helmet comprising a rigid outer shell including at least one layer of a fabric of a mixture of polybenzimidazole and aramid materials impregnated with and molded in a desired shape within a resin material wherein the resin material includes a coupling agent and said coupling agent is ZIRCONIUM IV DI NEOALKANOLATO, DI (PARA AMINO BENZOATO-O) which is present in a proportion by volume of one-half of one percent of the resin material.

8. A method of producing a shell of a firefighter's helmet comprising providing a first layer of a raschel knit cloth material, positioning a layer of very fine glass cloth on at least one side of said first layer, impregnating and enclosing all of said layers within a resin material, and molding the resin material and said layers into a desired shell shape, wherein the raschel knit cloth material is a mixture of polybenzimidazole and aramid, said mixture comprising by volume about thirty-four percent polybenzimidazole and about sixty-six percent aramid.

9. A method of producing a shell of a firefighter's helmet comprising providing a first layer of a raschel knit cloth material, positioning a layer of very fine glass cloth on at least one side of said first layer, impregnating and enclosing all of said layers within a resin material, and molding the resin material and said layers into a desired shell shape, wherein the raschel knit cloth material is a mixture of polybenzimidazole and aramid having a weight of about five ounces per square yard.

10. A method of producing a shell of a firefighter's helmet comprising providing a first layer of a raschel knit cloth material, positioning a layer of very fine glass cloth on at least one side of said first layer, impregnating and enclosing all of said layers within a resin material, and molding the resin material and said layers into a desired shell shape including admixing a coupling agent into the resin material.

11. A method of producing a shell of a firefighter's helmet comprising providing a first layer of a raschel knit cloth material, positioning a layer of very fine glass cloth on at least one side of said first layer, impregnating and enclosing all of said layers within a resin material, and molding the resin material and said layers into a desired shell shape including admixing a coupling agent into the resin material wherein the coupling agent is ZIRCONIUM IV DI NEOALKANOLATO, DI(-PARA AMINO BENZOATO-O).

12. A method of producing a shell of a firefighter's helmet comprising providing a first layer of a raschel knit cloth material, positioning a layer of very fine glass cloth on at least one side of said first layer, impregnating and enclosing all of said layers within a resin material, and molding the resin material and said layers into a desired shell shape including admixing a coupling agent into the resin material wherein the coupling agent is admixed in a proportion by volume of one-half of one percent of the resin material.

13. A method of producing a shell of a firefighter's helmet comprising providing a first layer of a raschel knit cloth material, positioning a layer of very fine glass cloth on at least one side of said first layer, impregnating and enclosing all of said layers within a resin material, and molding the resin material and said layers into a desired shell shape, wherein the very fine glass cloth comprises individual fibers of from 24 to 26 microns in diameter.

* * * * *